US007957726B2

(12) United States Patent
Whittington et al.

(10) Patent No.: US 7,957,726 B2
(45) Date of Patent: Jun. 7, 2011

(54) SYSTEM AND METHOD FOR PORTING A PERSONALIZED INDICIUM ASSIGNED TO A MOBILE COMMUNICATIONS DEVICE

(75) Inventors: Graeme Whittington, Waterloo (CA); Allan David Lewis, New Dundee (CA); James Godfrey, Waterloo (CA); Herb A. Little, Waterloo (CA); Marc Plumb, Kitchener (CA)

(73) Assignee: Research In Motion Limited, Waterloo (CA)

( * ) Notice: Subject to any disclaimer, the term of this patent is extended or adjusted under 35 U.S.C. 154(b) by 954 days.

(21) Appl. No.: 10/997,555

(22) Filed: Nov. 24, 2004

(65) Prior Publication Data

US 2006/0111039 A1 May 25, 2006

(51) Int. Cl.
| | |
|---|---|
| *H04M 3/00* | (2006.01) |
| *H04M 1/00* | (2006.01) |
| *H04M 3/42* | (2006.01) |
| *H04W 4/00* | (2009.01) |
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04J 3/06* | (2006.01) |
| *H04L 1/00* | (2006.01) |
| *H04L 12/26* | (2006.01) |

(52) U.S. Cl. ............... 455/418; 455/420; 455/432.1; 455/433; 455/551; 370/216; 370/350; 379/207.16

(58) Field of Classification Search ............ 455/8, 41.2, 455/67.111, 410, 411, 414.1, 436, 412.2, 455/418, 558, 432.1, 435.1, 471, 420, 452.2, 455/502, 551, 462, 557, 412.1, 417, 433, 455/39, 414.2, 421, 432.3, 435.2, 445, 461, 455/517, 32.2, 33.1, 56.1, 415, 416, 459, 51, 7, 554.1, 555, 560, 31, 32, 414, 41, 422, 426, 432, 435, 452, 550, 920, 419; 370/254, 328, 350, 338, 388, 392, 329, 352, 389, 395.52, 401; 380/270; 379/199, 200, 201, 212, 210, 211, 221.13; 340/825.49, 825.72; 342/44, 357, 457

See application file for complete search history.

(56) References Cited

U.S. PATENT DOCUMENTS 5,610,974 A * 3/1997 Lantto ...................... 455/433
(Continued)

FOREIGN PATENT DOCUMENTS

DE 197 37 126 A1 3/1999
(Continued)

OTHER PUBLICATIONS

European Search Report; European Patent Office; Apr. 11, 2007; 4 pages
(Continued)

*Primary Examiner* — Andrew Wendell
*Assistant Examiner* — Paul P Tran
(74) *Attorney, Agent, or Firm* — The Danamraj Law Group, P.C.

(57) ABSTRACT

In one embodiment, a scheme is provided for porting a personalized indicium, i.e., a Personal Information Number or PIN, from a first mobile communications device to a second mobile communications device. Upon receiving identity information from the first mobile communications device via a secure peer-to-peer communication session, the second mobile communications device is operable to negotiate with a network node using at least a portion of the received identity information for reassigning the PIN to an identifier associated therewith. Upon successfully porting the PIN to the second mobile communications device, a service provisioning database is accordingly updated.

18 Claims, 6 Drawing Sheets

U.S. PATENT DOCUMENTS

| | | | | |
|---|---|---|---|---|
| 5,903,833 | A * | 5/1999 | Jonsson et al. | 455/417 |
| 6,018,573 | A * | 1/2000 | Tanaka | 379/211.02 |
| 6,041,229 | A * | 3/2000 | Turner | 455/420 |
| 6,708,033 | B1 * | 3/2004 | Linkola et al. | 455/440 |
| 6,826,414 | B1 * | 11/2004 | Reynolds et al. | 455/555 |
| 6,915,136 | B2 * | 7/2005 | Kikuta et al. | 455/461 |
| 6,975,855 | B1 * | 12/2005 | Wallenius | 455/417 |
| 7,142,862 | B2 * | 11/2006 | Halsell | 455/445 |
| 7,242,923 | B2 * | 7/2007 | Perera et al. | 455/411 |
| 2003/0061503 | A1 | 3/2003 | Katz et al. | |
| 2003/0174838 | A1 * | 9/2003 | Bremer | 380/270 |
| 2004/0142684 | A1 * | 7/2004 | Ratert et al. | 455/420 |
| 2004/0170174 | A1 * | 9/2004 | Marsico et al. | 370/392 |
| 2004/0192211 | A1 * | 9/2004 | Gallagher et al. | 455/67.11 |
| 2006/0087999 | A1 * | 4/2006 | Gustave et al. | 370/328 |

FOREIGN PATENT DOCUMENTS

WO  WO 2004/054298 A1  6/2004

OTHER PUBLICATIONS

European Search Report; European Patent Office; May 6, 2005; 5 pages.

Canadian Office Action; Application 2,527,744; Canadian Intellectual Property Office; Jun. 2, 2009; 2 pages.

Canadian Office Action, Application No. 2,527,744, Canadian Intellectual Property Office, Sep. 16, 2010, 2 pgs.

* cited by examiner

SYSTEM AND METHOD FOR PORTING A PERSONALIZED INDICIUM ASSIGNED TO A MOBILE COMMUNICATIONS DEVICE

CROSS-REFERENCE TO RELATED APPLICATION(S)

This patent application discloses subject matter related to the subject matter disclosed in the following commonly owned co-pending patent applications: (i) "SYSTEM AND METHOD FOR SECURING A PERSONALIZED INDICIUM ASSIGNED TO A MOBILE COMMUNICATIONS DEVICE," filed Nov. 24, 2004, application Ser. No. 10/996, 702, in the name(s) of: David Bajar, Herb A. Little, James Godfrey, Allan David Lewis, Wen Gao, Marc Plumb, Michael Brown, Graeme Whittington, and Neil Adams; (ii) "SYSTEM AND METHOD FOR ASSIGNING A PERSONALIZED INDICIUM TO A MOBILE COMMUNICATIONS DEVICE," filed Nov. 24, 2004, application Ser. No. 10/997, 577, in the name(s) of: Graeme Whittington, Allan David Lewis, James Godfrey, Christopher Smith, Arun Munje, Thomas Leonard Trevor Plestid, David R. Clark, Michal A. Rybak, Robbie John Maurice, and Marc Plumb; and (iii) "SYSTEM AND METHOD FOR MANAGING SECURE REGISTRATION OF A MOBILE COMMUNICATIONS DEVICE," filed Nov. 24, 2004, application Ser. No. 10/996, 925, in the name(s) of: David Bajar, Allan David Lewis, Wen Gao, Herb A. Little, James Godfrey, Marc Plumb, Michael Brown, and Neil Adams; all of which are incorporated by reference herein.

FIELD OF THE APPLICATION

The present patent application generally relates to wireless packet data service networks. More particularly, and not by way of any limitation, the present patent application is directed to a system and method for porting a personalized indicium assigned to a mobile communications device that is operable to be disposed in a wireless packet data service network.

BACKGROUND

It is becoming commonplace to use wireless packet data service networks for effectuating data sessions with mobile communications devices. In some implementations, indicia such as Personal Information Numbers or PINs are assigned to the devices in order to facilitate certain aspects of service provisioning, e.g., security, validation and service authentication, et cetera. In such scenarios, it becomes imperative that no two devices have the same indicium (i.e., collision). Further, such PIN indicia are mapped to individual Internet Protocol (IP) addresses used in packet-switched networks so that a mobile communications device continues to send and receive messages even if its IP address is changed for some reason. For example, wireless carriers may dynamically assign an IP address to a data-enabled mobile device, and if that device is out of coverage, the previously assigned IP address is reclaimed and recycled for another device requesting service.

In addition, unique PIN indicia may be used for effectuating peer-to-peer type communications over a wireless carrier, e.g., direct messaging between two handheld devices, wherein the PINs assigned to the devices are used as messaging addresses. Accordingly, when a device is returned for repair or the user needs to switch to another device, possibly temporarily, the PIN address will have to be updated appropriately by all members of the user's contact list maintained with respect to the peer-to-peer messaging service. On the other hand, the user's identity for other types of communication, e.g., email address, may remain the same, however. Clearly, such a scenario is inconvenient for the subscribers as well as their contact members, and raises a challenging issue regarding PIN-based information management at the network level.

SUMMARY

In one embodiment, a scheme is provided for porting a personalized indicium, i.e., a Personal Information Number or PIN, from a first mobile communications device to a second mobile communications device. Upon receiving identity information from the first mobile communications device via a secure peer-to-peer communication session, the second mobile communications device is operable to negotiate with a network node using at least a portion of the received identity information for reassigning the PIN to an identifier associated therewith (i.e., device or subscriber identifiers such as IMEI, IMSI, ESN, MIN, et cetera). After successfully porting the PIN to the second mobile communications device, a service provisioning database is accordingly updated.

In another embodiment, a PIN porting method is disclosed which comprises: transferring identity information from a first mobile communications device to a second mobile communications device, the first mobile communications device's personalized indicium comprising a PIN that is mapped to an identifier associated therewith; and negotiating by the second mobile communications device with a network node using at least a portion of the identity information for reassigning the PIN to an identifier associated with the second mobile communications device.

In another embodiment, a mobile communications device is disclosed which comprises: logic means operable to engage in a communication session with another mobile communications device having a personalized indicium comprised of a PIN, wherein the PIN is mapped to an identifier relating to another mobile communications device; and logic means operable for negotiating with a network node using at least a portion of identity information received from the another mobile communications device for reassigning the PIN to an identifier associated with the mobile communications device.

In yet another embodiment, a network system is disclosed for porting a personalized indicium from a first mobile communications device to a second mobile communications device, which comprises: means for transferring identity information from the first mobile communications device to the second mobile communications device, the first mobile communications device's personalized indicium comprising a PIN that is mapped to an identifier associated therewith; and means for negotiating by the second mobile communications device with a network node using at least a portion of the identity information for reassigning the PIN to an identifier associated with the second mobile communications device.

BRIEF DESCRIPTION OF THE DRAWINGS

A more complete understanding of the embodiments of the present patent application may be had by reference to the following Detailed Description when taken in conjunction with the accompanying drawings wherein.

DETAILED DESCRIPTION OF THE DRAWINGS

Figure 1:
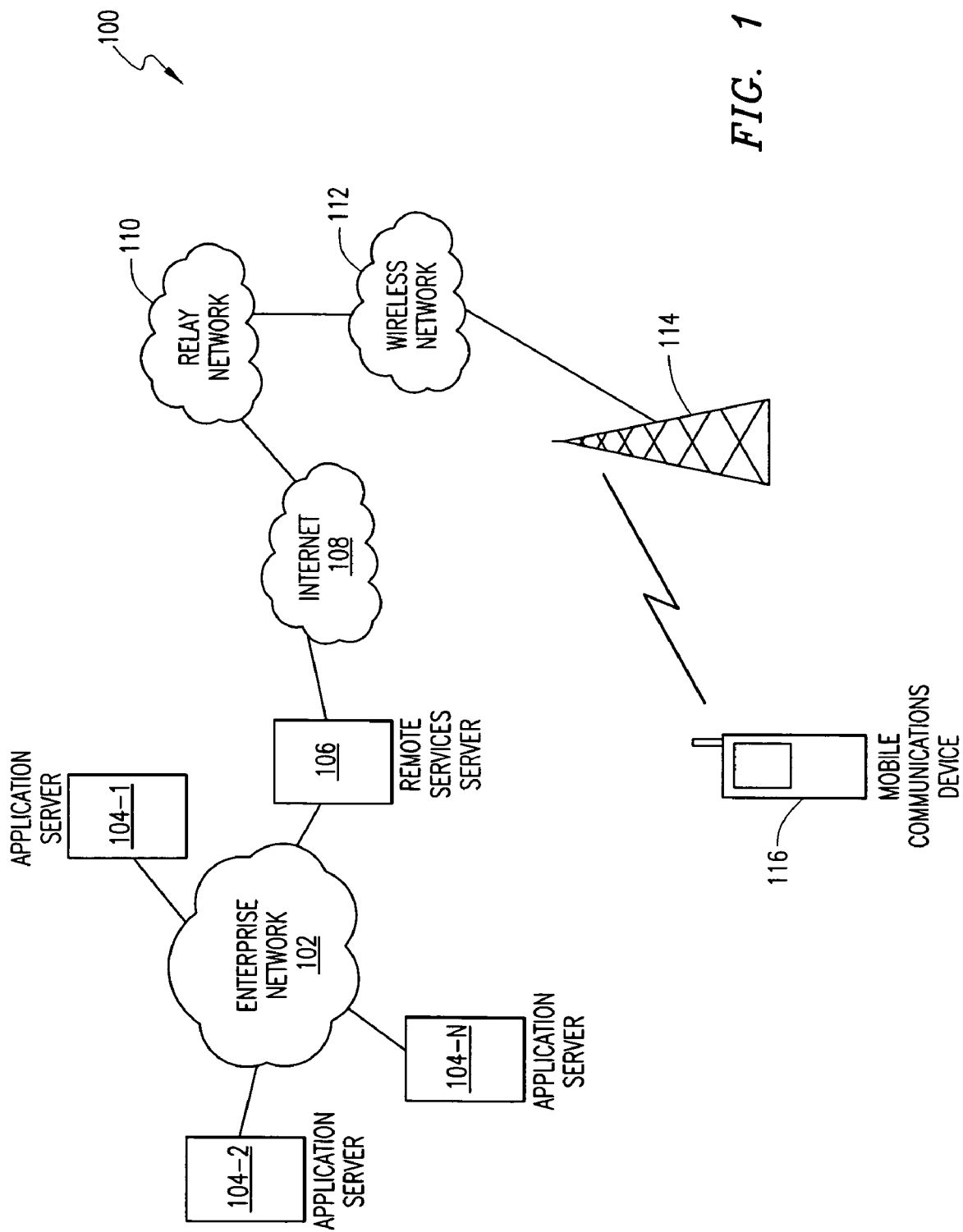
FIG. 1 depicts an exemplary network environment including a wireless packet data service network wherein an embodiment of the present patent application may be practiced.

A system and method of the present patent application will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network environment 100 including a wireless packet data service network 112 wherein an embodiment of the present patent application may be practiced. An enterprise network 102, which may be a packet-switched network, can include one or more geographic sites and be organized as a local area network (LAN), wide area network (WAN) or metropolitan area network (MAN), et cetera, for serving a plurality of corporate users. A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1, may be operably networked to one or more of the application servers 104-$i$, i=1, 2, . . . , N, with respect to the services supported in the enterprise network 102.

Additionally, a remote services server 106 may be interfaced with the enterprise network 102 for enabling a corporate user to access or effectuate any of the services from a remote location using a suitable mobile communications device (MCD) 116. A secure communication link with end-to-end encryption may be established that is mediated through an external IP network, i.e., a public packet-switched network such as the Internet 108, as well as the wireless packet data service network 112 operable with MCD 116 via suitable wireless network infrastructure that includes a base station (BS) 114. In one embodiment, a trusted relay network 110 may be disposed between the Internet 108 and the infrastructure of wireless packet data service network 112. In another embodiment, the infrastructure of the trusted relay network 110 may be integrated with the wireless packet data service network 112, whereby the functionality of the relay infrastructure, certain aspects of which will be described in greater detail below, is consolidated as a separate layer within a "one-network" environment. Additionally, by way of example, MCD 116 may be a data-enabled mobile handheld device capable of receiving and sending messages, web browsing, interfacing with corporate application servers, et cetera, regardless of the relationship between the networks 110 and 112. Accordingly, a "network node" may include both relay functionality and wireless network infrastructure functionality in some exemplary implementations.

For purposes of the present patent application, the wireless packet data service network 112 may be implemented in any known or heretofore unknown mobile communications technologies and network protocols, as long as a packet-switched data service is available therein for transmitting packetized information. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, or any $3^{rd}$ Generation (3G) network. As will be seen hereinbelow, the embodiments of the present patent application for securing a personalized indicium such as a PIN with respect to MCD 116 will be described regardless of any particular wireless network implementation.

Figure 2:
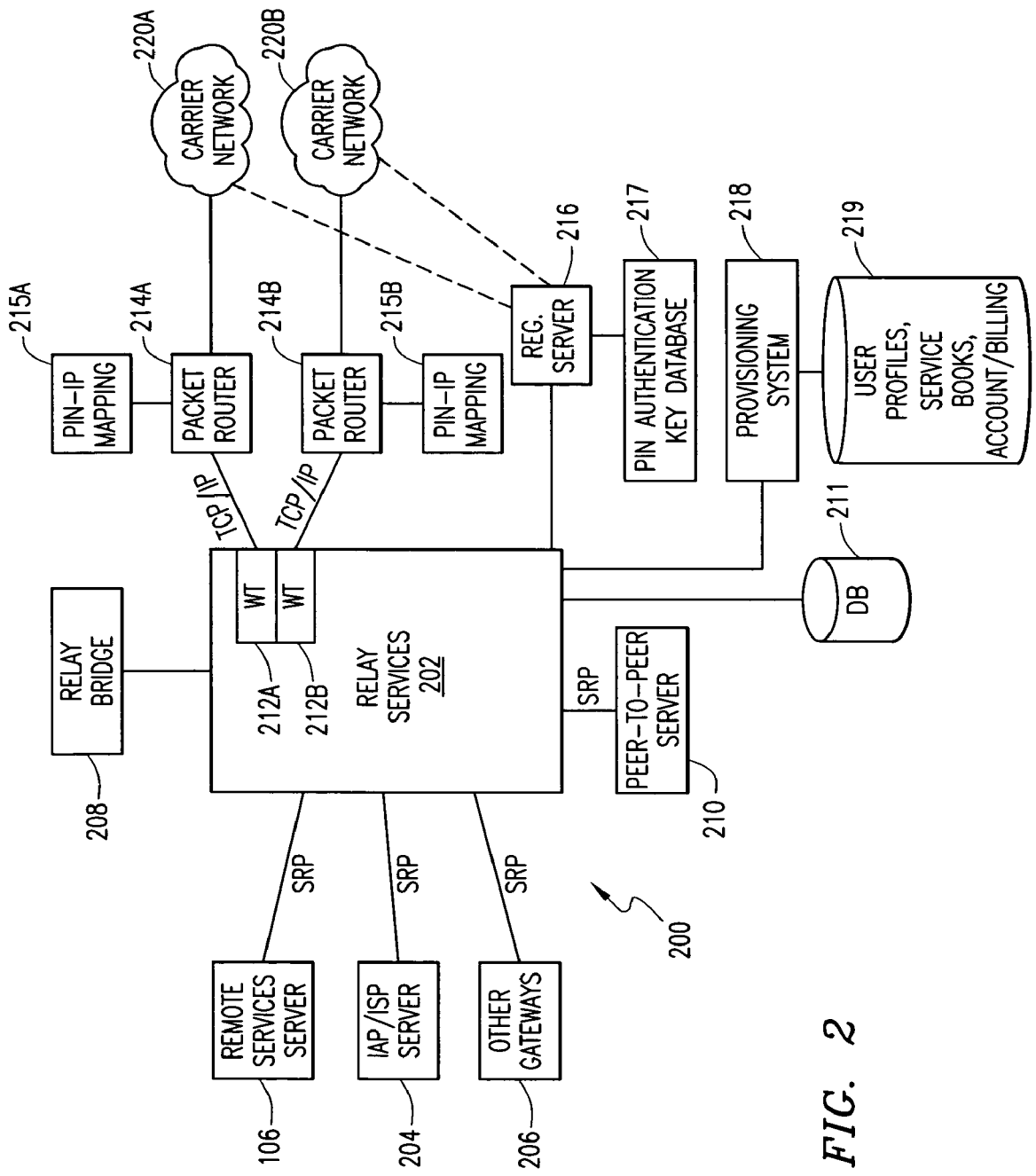
FIG. 2 depicts additional details of an exemplary relay network operable with a mobile communications device in accordance with an embodiment.

FIG. 2 depicts additional details of an exemplary relay network infrastructure 200 operable as part of relay network 110 interfacing with the wireless packet data service network 112 described above. A relay services node 202 is operable, at least in part, for providing connectivity between MCDs and various data application services (enterprise services, external IP data services, et cetera), regardless of the geographic location of the MCDs and their respective wireless carriers. Also, since multiple relay services nodes can co-exist in a distributed network architecture, a relay bridge 208 may be provided in operable connection with the relay services node 202 for supporting inter-relay connectivity. In one implementation, relay bridge 208 connects with separate relay node sites, forming tunnels between relays over which MCD messages can flow to and from services, irrespective of the region where the MCD is in.

Communication between the relay services node 202 and various application gateways and servers is effectuated using any suitable protocol, e.g., Server Relay Protocol (SRP), preferably over IP links. By way of illustration, remote services server 106 associated with the enterprise network 102 (shown in FIG. 1) communicates with the relay using SRP for effectuating internal data services with respect to the enterprise's mobile subscribers. Likewise, reference numerals 204 and 206 refer to external application gateways, such as Internet Service Provider (ISP) or Internet Access Provider (IAP) servers, and other gateways, respectively, which are also interfaced with the relay node 202 using SRP. A peer-to-peer server 210 may also be provided in operable connection with the relay node 202 for handling peer-level messaging between two MCDs using their respective PIN indicia.

Additionally, a database 211 may be provided in operable connection with the relay node 202 for handling and managing MCD location information. Preferably, this location information is stored by PIN indicia of the MCDs, which may be programmed into the devices at the time of manufacture or dynamically assigned afterwards, wherein the records maintain a particular device's last known location. A registration server 216 is operable for providing registration services for MCDs when they are initially activated or when the user re-registers due to moving to a different wireless network coverage area. In one implementation, the location information of registration server 216 may be programmed into an MCD. When the MCD registers successfully, registration server 216 is operable to provide the serving relay node's location, whereupon data sessions may be engaged by the MCD. Further, a database 217 is associated with the registration server 216 for storing a PIN authentication key provided by the MCD during its registration with the network. As will be seen in greater detail below, the PIN authentication key may be used by the network logic in facilitating the porting of the PIN indicium of an MCD to another MCD via a secure peer-to-peer communication session so that a subscriber may upgrade or otherwise replace his or her handheld device without relinquishing associated service books, provisioning or subscriber profiles, accounting/billing data, or any PIN-based service such as peer-to-peer messaging.

One or more wireless transport (WT) interfaces are provided as part of relay services node 202 for connecting with wireless carrier networks that service MCDs. By way of illustration, WT 212A and WT 212B communicate with respective packet routers 214A and 214B using TCP/IP links, which route data packets to and from respective wireless packet data service networks, exemplified in FIG. 2 as carrier network 220A and carrier network 220B. To facilitate accurate routing, packet routers 214A, 214B are provided with PIN-IP mapping tables 215A and 215B that are used to route packets over IP networks. When a WT addresses a packet by PIN, the corresponding packet router interrogates the mapping table to look up and retrieve the current IP address for the MCD. In one implementation, the packet routers are operable to update the IP address of the MCD in the mapping tables every time they receive a packet. In another implementation, the IP-PIN mapping tables may be updated as necessary, e.g., when the IP address of an MCD is changed because it is dynamically assigned and may be reclaimed after the MCD has roamed out of a serving area.

Continuing to refer to FIG. 2, registration server 216, which handles administration and registration services for MCDs, may also be provided with separate WT and packet routing for interfacing with the carrier networks 220A, 220B, although not specifically shown. A provisioning system (PRV) 218 may be co-located or otherwise associated with the relay services node 202 for setting up and managing various service providers (i.e., carrier networks), subscribers, MCD manufacturers, resellers, and other entities in order to support any number of service and market differentiation requirements. Additionally, the provisioning system 218 may include logic for provisioning personalized indicia (e.g., PIN assignment and management) with respect to the MCDs. Also, subscriber validation logic may be provided as part of the provisioning system 218. A service provisioning database 219 is therefore associated with the provisioning system 218 for maintaining subscriber/user profiles, service books, accounting information, et cetera, based on PINs, hard-coded device identifiers, subscriber identifiers, and other indicia.

One skilled in the art should appreciate that the various databases and service logic processing set forth above with respect to the relay network may be realized in suitable hardware, firmware and/or firmware logic blocks or in combination thereof. Furthermore, as alluded to before, the functionality of the relay network may also be integrated within a wireless carrier network, whereby a "network node" may generally comprise the relay layer functionality as well.

Figure 3:
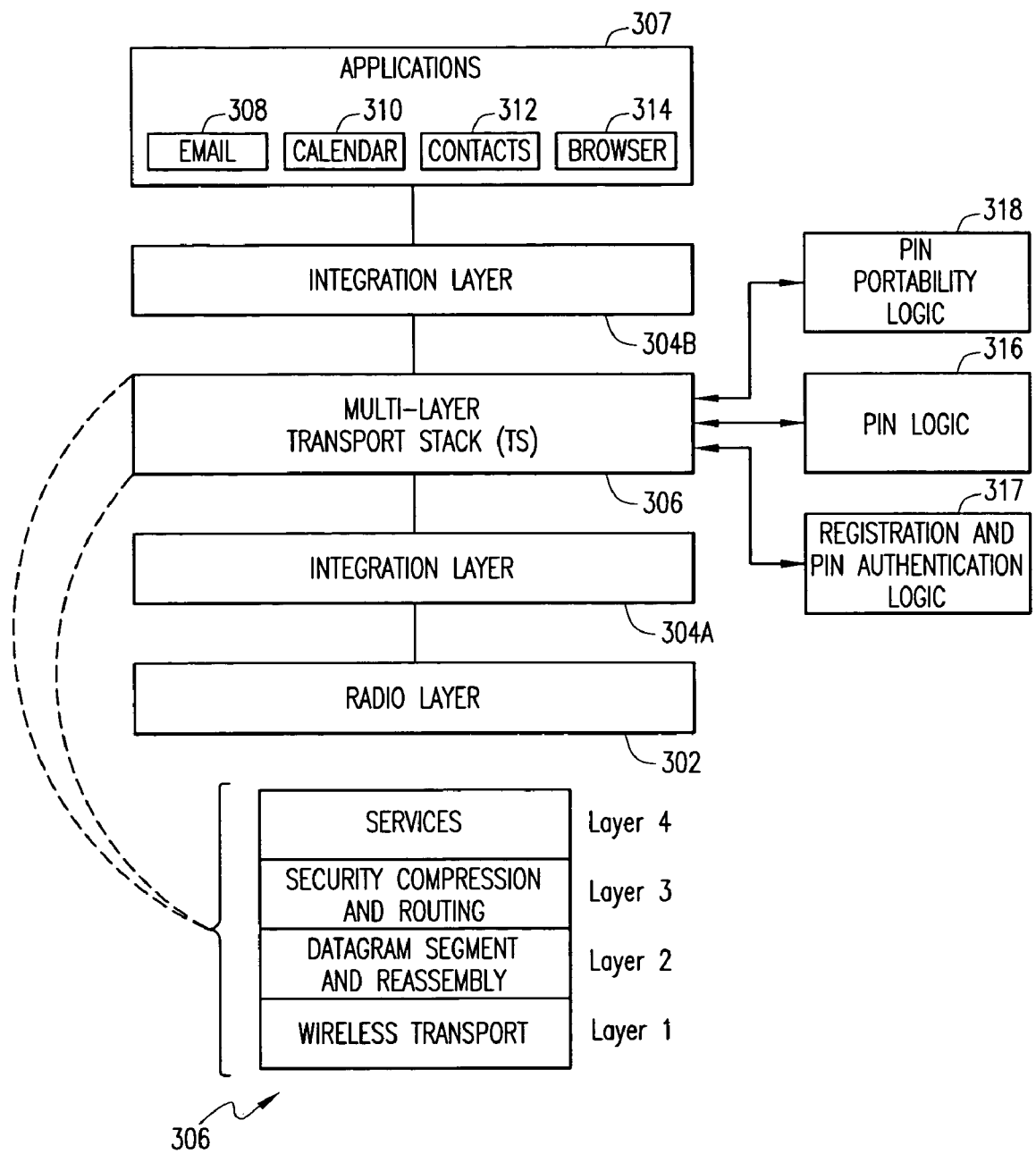
FIG. 3 depicts a software architectural view of a mobile communications device (MCD) according to one embodiment.

FIG. 3 depicts a software architectural view of a mobile communications device operable according to one embodiment. A multi-layer transport stack (TS) 306 is operable to provide a generic data transport protocol for any type of corporate data, including email, via a reliable, secure and seamless continuous connection to a wireless packet data service network. As illustrated in the embodiment of FIG. 3, an integration layer 304A is operable as an interface between the MCD's radio layer 302 and the transport stack 306. Likewise, another integration layer 304B is provided for interfacing between the transport stack 306 and the user applications 307 supported on the MCD, e.g., email 308, calendar/scheduler 310, contact management 312 and browser 314. Although not specifically shown, the transport stack 306 may also be interfaced with the MCD's operating system. In another implementation, the transport stack 306 may be provided as part of a data communications client module operable as a host-independent virtual machine on a mobile device.

The bottom layer (Layer 1) of the transport stack 306 is operable as an interface to the wireless network's packet layer. Layer 1 handles basic service coordination within the exemplary network environment 100 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. The remaining two layers, Layer 2 and Layer 3, are responsible for datagram segmentation/reassembly and security, compression and routing, respectively.

A PIN logic module 316 provided as part of the MCD's software environment is disposed in operable communication with the transport stack 306 as well as the OS environment. In one embodiment, the PIN logic module 316 comprises logic operable to request a PIN indicium from the provisioning network in a dynamic assignment, wherein a temporary PIN may be generated for effectuating pre-registration communication with the network. Alternatively, the PIN logic may include storage means for storing a PIN that is encoded during manufacture. Regardless of the PIN assignment mechanism, once a PIN is persistently associated with an MCD, it is bound to the MCD's hardware device identifier(s) and/or subscriber identifier(s) such as, e.g., International Mobile station Equipment Identity (IMEI) parameters, International Mobile Subscriber Identity (IMSI) parameters, Electronic Serial Number (ESN) parameters, Mobile Identification Number (MIN) parameters, et cetera, that are associated with MCDs depending on the wireless network technologies and protocols.

Continuing to refer to FIG. 3, a registration and PIN authentication logic module 317 provided as part of the MCD's software environment is disposed in operable communication with the transport stack 306 as well as the OS environment for effectuating registration procedures and PIN authentication services (e.g., generation of a PIN authentication key for transmission via a registration request to the network, digital signature generation in a challenge response, et cetera).

A PIN portability logic module 318, also provided as part of the MCD's software environment, may interface with applications 307 via TS 306, wherein suitable application logic includes means operable to initiate a peer-to-peer communication session with another MCD. Additional logic is also associated therewith for negotiating with a network node using at least a portion of the information received from the other MCD for reassigning the other MCD's PIN to itself (i.e., the negotiating MCD). Since PIN assignment and management generally involves mapping at least one of a hard-coded device identifier (such as, e.g., IMEI, ESN, et cetera) or a subscriber identifier (e.g., IMSI) (collectively, "identifier") associated with an MCD to a corresponding unique PIN in the network databases, in addition to PIN's association to service provisioning and authentication features, PIN portability is predicated upon disassociating one PIN-to-ID1 mapping and replacing it with another PIN-to-ID2 mapping so that the PIN is bound to a different device (having the identifier ID2). Preferably, such porting transaction is effectuated in a secure manner so that a valid PIN is not transferred to an unauthorized device. For purposes of the present patent application, therefore, the process of transferring a PIN is provided as comprising two parts: (a) transfer of identification, authentication and service-enabling information (collectively, "identity information"), and (b) claiming or reassignment of the PIN using at least a portion of the identity information (e.g., the authentication information). In addition, proper failsafe features are preferably implemented during the PIN transfer process in order to ensure that regular data transactions do not get redirected to the target device (i.e., the device negotiating for the reassignment of the PIN) until after the transfer is complete and validated. Otherwise, messages could be lost due to decryption failures, for example.

Figure 4A:
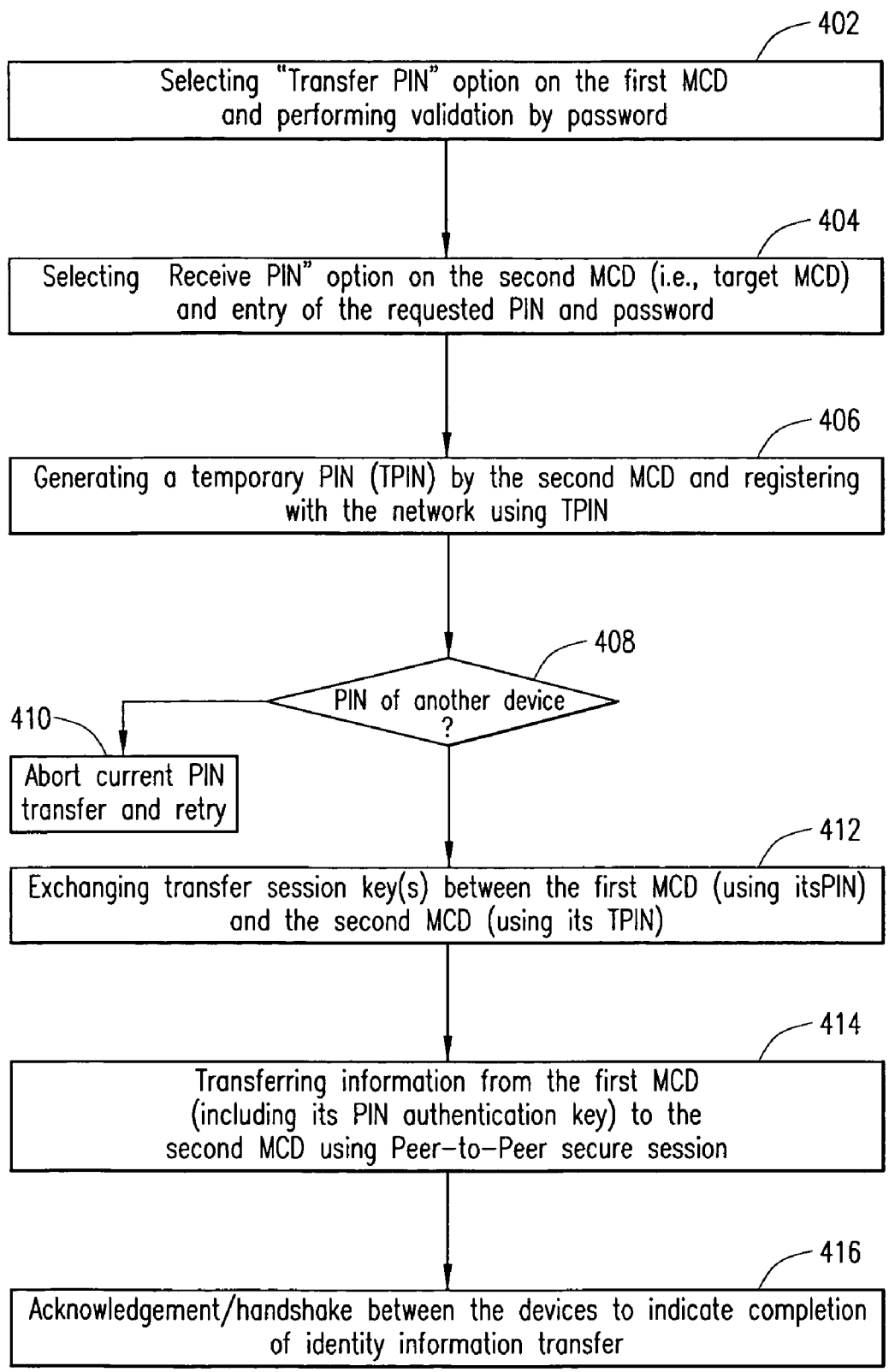
FIGS. 4A and 4B depict a flowchart of an embodiment for porting a PIN indicium assigned to a first MCD to another MCD.
Figure 4B:
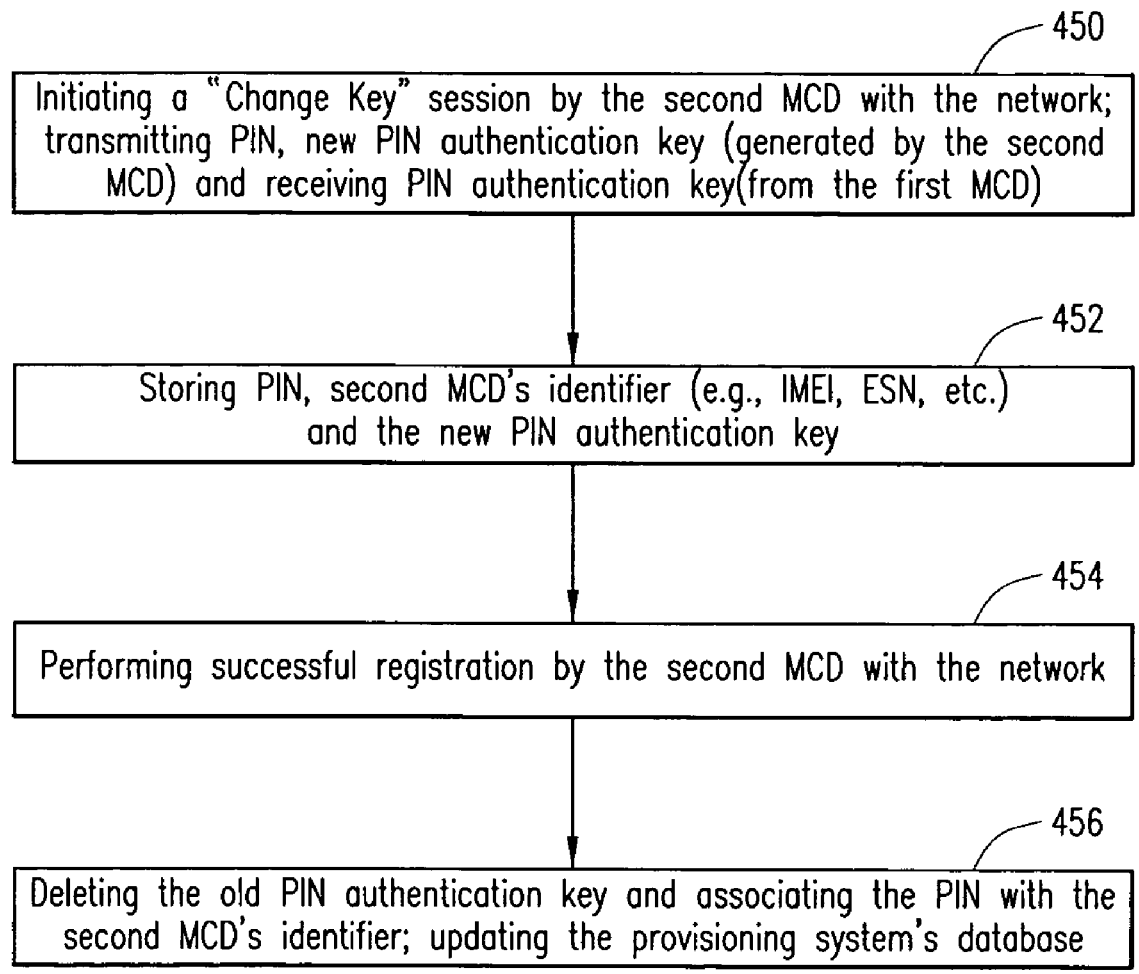

FIGS. 4A and 4B depict a flowchart of an embodiment for porting a PIN indicium assigned to a first MCD to another MCD. In particular, FIG. 4A depicts the transfer process of identity information from the first MCD to the second MCD (i.e., the target device). In a presently preferred exemplary embodiment, a secure peer-to-peer communication session is effectuated between the two devices via the relay network's peer-to-peer server. On the first device, the user selects a "Transfer PIN" option, whereupon appropriate validation may be performed as required (block 402). For instance, a dialog screen on the MCD may request that a password be entered. The password may be a short-term alphanumeric string used to identify the user for effectuating any PIN-based transactions, e.g., identity information transfer to another device. On the second device, i.e., the target MCD, the user selects a "Receive PIN" option, whereupon the requested PIN and the password are entered (block 404). Using the PIN logic on the target device, a temporary PIN (TPIN) is generated for registering with the relay/network node (block 406). In one implementation, the TPIN may be randomly selected from a selected range of numbers or calculated using a hashing technique on the MCD's device/subscriber identifiers (e.g., IMEI/ESN parameters). If the TPIN generated by the target MCD is the same as the PIN used by another device (block 408), then the current transfer process may be aborted, preferably with a retry option using a new TPIN (block 410). Otherwise, through a sequence of packets exchanged between the two devices (preferably initiated by the target device since it is aware of both its own TPIN and the PIN of the first device), the first MCD using its PIN and the second MCD using its TPIN negotiate a set of one or more transfer session encryption/decryption keys (e.g., public/private keys) in order to establish a secure connection between the two devices (block 412). Once the secure connection is established, identity information is transferred from the first MCD to the second MCD using the peer-to-peer service (block 414). After the information has been received, an acknowledgment/handshake process may take place between the devices to indicate completion of the identity information transfer (block 416).

Referring now in particular to FIG. 4B, an embodiment of PIN reassignment process is shown therein as a flowchart, where the second MCD negotiates with the network node for PIN reassignment. A "Change Key" session is initiated by the second MCD using a suitable command transmitted to the relay network's registration server, wherein the command preferably includes the PIN, the received PIN authentication key (from the first MCD) and a new PIN authentication key generated by the second MCD (block 450). The PIN, new PIN authentication key and the second MCD's identifier information (i.e., IMEI, ESN, etc.) are stored in the registration server database (452). Upon successful registration by the second MCD (block 454), the network may delete the "old" PIN authentication key (i.e, the first MCD's key) and disassociate the PIN/device ID mapping relating to the first MCD. Thereafter, a new PIN/device ID mapping is created using the second MCD's ID information, which is transmitted to the provisioning system for updating its database (block 456).

Those skilled in the art will recognize upon reference hereto that several additional features, modifications and enhancements may be possible with respect to the PIN portability process set forth hereinabove. For example, the target MCD may not be allowed to drop the old PIN authentication key until it receives appropriate response(s) from the registration server since repeated registration attempts are sometimes necessary. Also, as alluded to earlier, a variety of administrative passwords may be imposed in order to ensure that the person using the MCDs is in fact allowed to use them. Relatedly, the application programming interfaces (APIs) and storage locations for the PIN and password information on the device are preferably provided to be secure (i.e., "unhackable"); otherwise identity theft may become an issue. Further, an enterprise-based information technology (IT) policy may be implemented so as to disable the PIN portability features on a subscriber-by-subscriber basis.

Figure 5:
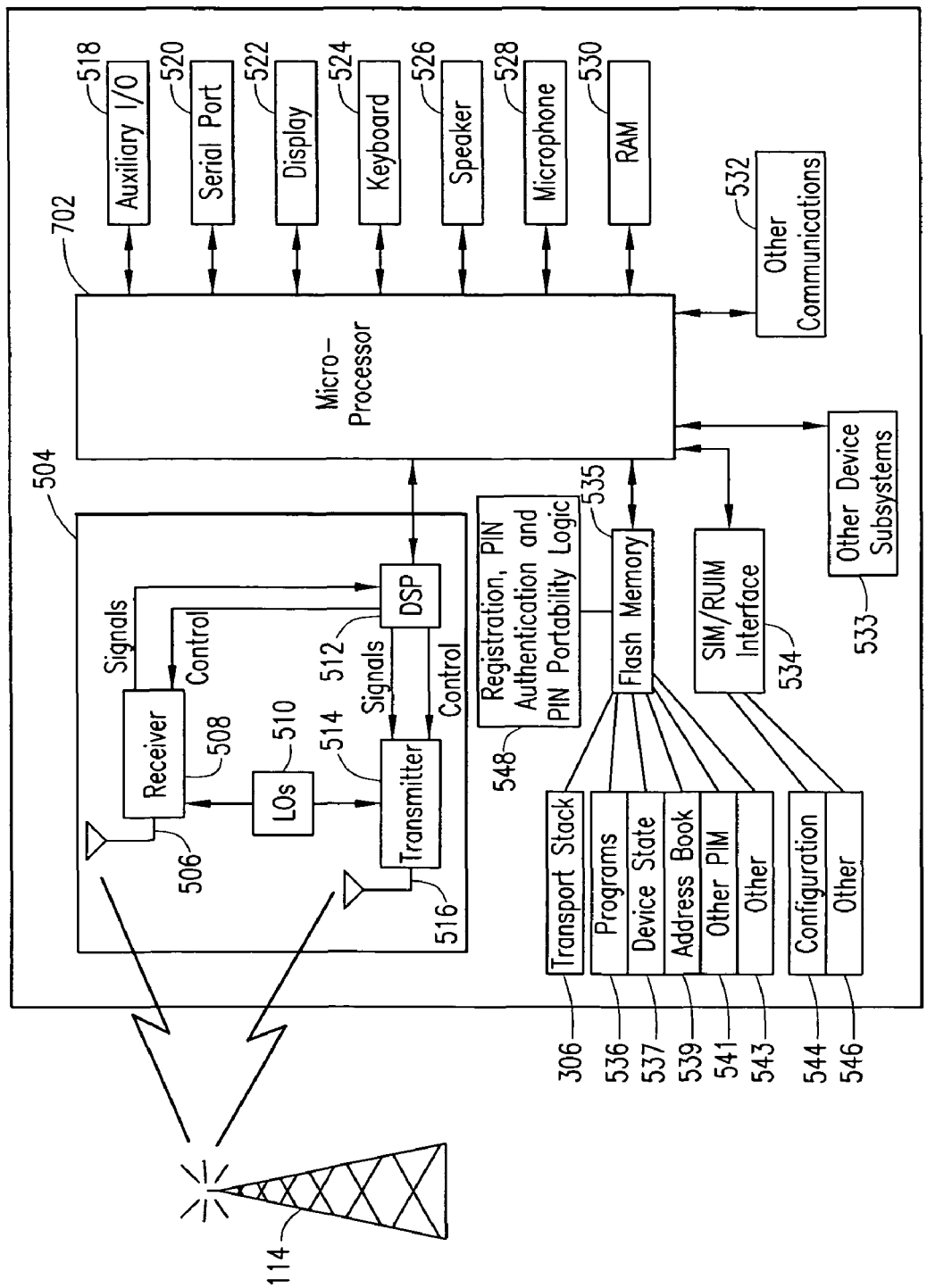
FIG. 5 depicts a block diagram of a mobile communications device according to one embodiment.

FIG. 5 depicts a block diagram of a mobile communications device operable according to one embodiment. It will be recognized by those skilled in the art upon reference hereto that although an embodiment of MCD 116 may comprise an arrangement similar to one shown in FIG. 5, there can be a number of variations and modifications, in hardware, software or firmware, with respect to the various modules depicted. Accordingly, the arrangement of FIG. 5 should be taken as illustrative rather than limiting with respect to the embodiments of the present patent application. A microprocessor 502 providing for the overall control of an embodiment of MCD 116 is operably coupled to a communication subsystem 504 which includes a receiver 508 and transmitter 514 as well as associated components such as one or more local oscillator (LO) modules 510 and a processing module such as a digital signal processor (DSP) 512. As will be apparent to those skilled in the field of communications, the particular design of the communication module 504 may be dependent upon the communications network with which the mobile device is intended to operate. In one embodiment, the communication module 504 is operable with both voice and data communications. Regardless of the particular design, however, signals received by antenna 506 through BS 114 are provided to receiver 508, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 512, and provided to transmitter 514 for digital-to-analog (D/A) conversion, frequency up conversion, filtering, amplification and transmission over the air-radio interface via antenna 516.

Microprocessor 502 also interfaces with further device subsystems such as auxiliary input/output (I/O) 518, serial port 520, display 522, keyboard 524, speaker 526, microphone 528, random access memory (RAM) 530, a short-range communications subsystem 532, and any other device subsystems generally labeled as reference numeral 533. To control access, a Subscriber Identity Module (SIM) or Removable user Identity Module (RUIM) interface 534 is also provided in communication with the microprocessor 502. In one implementation, SIM/RUIM interface 534 is operable with a SIM/RUIM card having a number of key configurations 544 and other information 546 such as identification and subscriber-related data.

Operating system software and transport stack software may be embodied in a persistent storage module (i.e., non-volatile storage) such as Flash memory 535. In one implementation, Flash memory 535 may be segregated into different areas, e.g., storage area for computer programs 536 as well as data storage regions such as device state 537, address book 539, other personal information manager (PIM) data 541, and other data storage areas generally labeled as reference numeral 543. A logic module 548 is provided for storing a PIN assigned to the MCD, dynamically or otherwise, as well as for generating a PIN authentication key for transmission via registration. Also associated therewith is suitable logic for supporting the various PIN portability processes and operations described hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A method for porting a Personal Information Number (PIN) from a first mobile communications device to a second mobile communications device, the method comprising:
generating a temporary PIN by said second mobile communications device for registration with a network node;
receiving identity information comprising said PIN from said first mobile communications device by said second mobile communications device via a peer-to-peer communication session, said identity information from said first mobile communications device including a first PIN authentication key and an identifier associated therewith that is mapped to said PIN; and
negotiating by said second mobile communications device with said network node using at least a portion of said received identity information to effectuate reassignment of said PIN to an identifier associated with said second mobile communications device and to effectuate disassociation of said PIN from said identifier associated with said first mobile communications device, wherein negotiating with said network node comprises issuing a command that includes said PIN, said first PIN authentication key and a second PIN authentication key generated by said second mobile communications device.

2. The method for porting a PIN as recited in claim 1, wherein said network node is operable with a wireless packet data service network comprising one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access (CDMA) network and a Universal Mobile Telecommunications System (UMTS) network.

3. The method for porting a PIN as recited in claim 1, wherein said identifier associated with one of said first and second mobile communications devices comprises at least one of an International Mobile station Equipment Identity (IMEI) parameter, an International Mobile Subscriber Identity (IMSI) parameter, an Electronic Serial Number (ESN) parameter and a Mobile Identification Number (MIN) parameter.

4. The method for porting a PIN as recited in claim 1, further comprising determining if said temporary PIN is identical to a PIN used by another mobile communications device.

5. The method for porting a PIN as recited in claim 4, further comprising effectuating an acknowledgment process between said first mobile communications device to said second mobile communications device upon completion of receiving said identity information.

6. The method for porting a PIN as recited in claim 1, wherein said network node is operable to associate said PIN with said identifier of said second mobile communications device.

7. The method for porting a PIN as recited in claim 6, wherein said network node is operable to discard said PIN's mapping to said first mobile communications device's identifier upon a successful registration by said second mobile communications device.

8. The method for porting a PIN as recited in claim 7, further comprising updating of a service provisioning database associated with said network node.

9. A mobile communications device, comprising:
A processor configured to control at least one of a plurality of subsystems for communicating with a network node;
the processor further configured to control at least one of a plurality of subsystems for engaging in a peer-to-peer communication session with another mobile communications device and receiving identity information from said another mobile communications device, said identity information received from said another mobile communication device including a Personal Information Number (PIN) and a first PIN authentication key, wherein said PIN is mapped to an identifier relating to said another mobile communications device; and wherein said identity information is received by the mobile communications device after the mobile communications device has generated a temporary PIN for registration with the network node; and
the processor further configured to control a at least one of a plurality of subsystems for negotiating with the network node using at least a portion of identity information received from said another mobile communications device for reassigning said PIN to an identifier associated with said mobile communications device and for disassociating said PIN from said identifier associated with said another mobile communications device, wherein negotiating with the network node comprises issuing a command that includes said PIN, said first PIN authentication key and a second PIN authentication key generated by said mobile communications device.

10. The mobile communications device as recited in claim 9, wherein said network node is operable with a wireless packet data service network comprising one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access (CDMA) network and a Universal Mobile Telecommunications System (UMTS) network.

11. The mobile communications device as recited in claim 9, wherein said identifier associated with one of said mobile communications device and said another mobile communications device comprises at least one of an International Mobile station Equipment Identity (IMEI) parameter, an International Mobile Subscriber Identity (IMSI) parameter, an Electronic Serial Number (ESN) parameter and a Mobile Identification Number (MIN) parameter.

12. The mobile communications device as recited in claim 9, wherein the processor is further configured to control at least one of a plurality of subsystems for generating a temporary PIN for registration with said network node.

13. The mobile communications device as recited in claim 9, wherein the processor is further configured to control at least one of a plurality of subsystems for effectuating an acknowledgment process with said another mobile communications devices upon completion of receiving said identity information.

14. The mobile communications device as recited in claim 9, wherein the processor is further configured to control at least one of a plurality of subsystems for registering with said network node using said PIN ported from said another mobile communications device.

15. A network node for effectuating the reassignment of a Personal Information Number (PIN) from a first mobile communications device to a second mobile communications device, the network node comprising:

means for receiving a command generated by said second mobile communications device, the command including at least identity information associated with said first mobile communications device, said PIN, a first PIN authentication key, and a second PIN authentication key generated by said second mobile communications device, wherein said identity information is received from said first mobile communications device via a peer-to-peer communication session after said second mobile communications device has generated a temporary PIN for registration with the network node, said identity information from said first mobile communications device including the first PIN authentication key and an identifier associated with the first mobile communications device that is mapped to said PIN;

means for dissociating said PIN from the identifier associated with said first mobile communications device; and means for mapping said PIN to an identifier associated with said second mobile communications device.

16. The network node according to claim 15, further comprising means for updating a service provisioning database associated with said network node.

17. The network node according to claim 15 wherein said identifier associated with one of said first and second mobile communications devices comprises at least one of an International Mobile station Equipment Identity (IMEI) parameter, an International Mobile Subscriber Identity (IMSI) parameter, an Electronic Serial Number (ESN) parameter and a Mobile Identification Number (MIN) parameter.

18. The network node according to claim 15 wherein said means for dissociating said PIN from the identifier associated with said first mobile communications device is operable responsive to a successful registration by said second mobile communications device.

* * * * *

UNITED STATES PATENT AND TRADEMARK OFFICE
CERTIFICATE OF CORRECTION

PATENT NO.         : 7,957,726 B2                                                   Page 1 of 1
APPLICATION NO.    : 10/997555
DATED              : June 7, 2011
INVENTOR(S)        : Graeme Whittington et al.

It is certified that error appears in the above-identified patent and that said Letters Patent is hereby corrected as shown below:

Column 10,
Line 23, "A processor" should read -- a processor --.

Column 10,
Line 31, "communication device" should read -- communications device --.

Column 10,
Line 34, "communications device;" should read -- communications device, --.

Column 10,
Line 39, "to control a at least" should read -- to control at least --.

Signed and Sealed this
Fourth Day of October, 2011

David J. Kappos
*Director of the United States Patent and Trademark Office*